(12) United States Patent
Georgis et al.

(10) Patent No.: US 8,391,563 B2
(45) Date of Patent: Mar. 5, 2013

(54) USING COMPUTER VIDEO CAMERA TO DETECT EARTHQUAKE

(75) Inventors: Nikolaos Georgis, San Diego, CA (US); Keisuke Omori, Sunnyvale, CA (US)

(73) Assignee: Sony Corporation, Tokyo (JP)

( * ) Notice: Subject to any disclaimer, the term of this patent is extended or adjusted under 35 U.S.C. 154(b) by 315 days.

(21) Appl. No.: 12/786,962

(22) Filed: May 25, 2010

(65) Prior Publication Data
US 2011/0292220 A1    Dec. 1, 2011

(51) Int. Cl.
*G06K 9/00* (2006.01)
*H04N 5/225* (2006.01)
(52) U.S. Cl. .............. 382/109; 348/207.1; 348/169
(58) Field of Classification Search .............. 382/109; 348/208.2, 207.1, 169–172
See application file for complete search history.

(56) References Cited

U.S. PATENT DOCUMENTS

| | | | |
|---|---|---|---|
| 5,657,003 A * | 8/1997 | Fuentes | 340/690 |
| 5,910,763 A * | 6/1999 | Flanagan | 340/286.02 |
| 6,121,888 A | 9/2000 | Bognar | |
| 6,518,878 B1 * | 2/2003 | Skoff | 340/506 |
| 7,375,646 B1 * | 5/2008 | Diaz-Lopez | 340/690 |
| 2004/0098200 A1 | 5/2004 | Wentland et al. | |
| 2005/0243921 A1 | 11/2005 | Au et al. | |
| 2006/0221187 A1 * | 10/2006 | Alhadef | 348/207.1 |
| 2007/0033153 A1 * | 2/2007 | Yamanaka et al. | 706/21 |
| 2007/0199382 A1 | 8/2007 | Sakai | |
| 2007/0206678 A1 * | 9/2007 | Kondo | 375/240.17 |
| 2008/0059074 A1 | 3/2008 | Wei et al. | |
| 2008/0170756 A1 * | 7/2008 | Beucher et al. | 382/109 |
| 2008/0212208 A1 | 9/2008 | Yao et al. | |
| 2009/0157322 A1 | 6/2009 | Levin | |
| 2009/0168887 A1 | 7/2009 | Lin | |
| 2009/0204707 A1 * | 8/2009 | Kamegaya et al. | 709/224 |
| 2010/0183198 A1 * | 7/2010 | Marmal Yevskyy et al. | 382/109 |
| 2011/0091078 A1 * | 4/2011 | Kherroubi et al. | 382/109 |
| 2011/0211097 A1 * | 9/2011 | Omori | 348/264 |

FOREIGN PATENT DOCUMENTS

WO    0233558    4/2002

OTHER PUBLICATIONS

Jesse F. Lawrence et al., "Quake-Catcher Network, Laptop Network" http://gcn.stanford.edu/about/laptop.php.
V. Argyriou and T. Vlachos, "A Study of sub-pixel motion estimation using phase correlation", Centre for Vision, Speech and Signal Processing University of Surrey pp. 1-10.
Jung W. Suh, Jechang Jeong, "Fast Sub-pixel Motion Estimation Techniques Having Lower Computational Complexity" IEEE Transactions on Consumer Electronics, vol. 50, No. 3, Aug. 2004.

* cited by examiner

*Primary Examiner* — Sinh Tran
*Assistant Examiner* — Christopher K Peterson
(74) *Attorney, Agent, or Firm* — Sony Corporation of America

(57) ABSTRACT

Images from the video camera of a computer are compared over time, e.g., every few milliseconds, to determine from the pixel data if motion of the computer matches template motion associated with an earthquake P-wave. If so, a warning is generated, uploaded to a communication network, and propagated over the network to other computers.

16 Claims, 3 Drawing Sheets

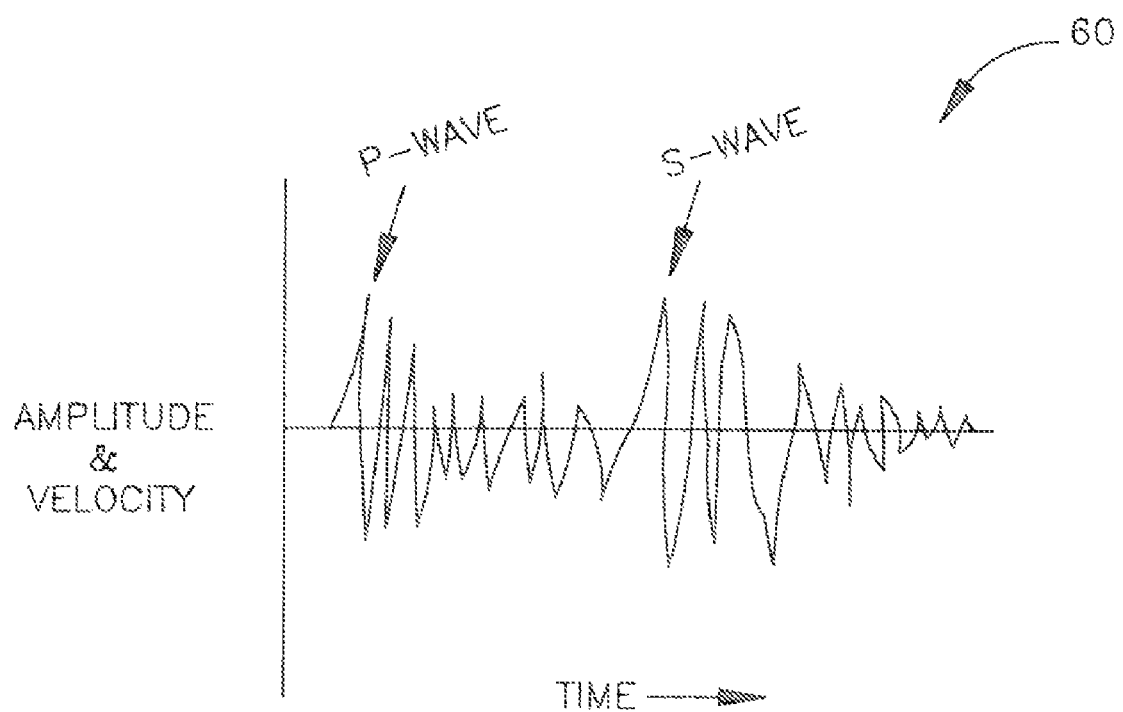

USING COMPUTER VIDEO CAMERA TO DETECT EARTHQUAKE

I. FIELD OF THE INVENTION

The present application relates generally to using a video camera on a computer to provide early warning of an earthquake.

II. BACKGROUND OF THE INVENTION

Earthquake early warning systems can provide a few to a few tens of seconds warning prior to damaging ground shaking, depending on the distance of the warned entity from the epicenter. Essentially, early warning systems use accelerometers to detect the initial primary wave (P-wave) of a quake, which typically is perceived as a jolt and which precedes the more damaging secondary waves (S-waves) because the P-wave travels faster.

Although providing only a short window of warning, an early warning system nonetheless can allow for short-term mitigation including slowing and stopping of transportation systems, switching industrial and utility systems to a safe mode, and taking personal protective measures. In other words, while a few seconds may not sound like much, it is enough time for school children to dive under their desks, gas and electric companies to shut down or isolate their systems, phone companies to reroute traffic, airports to halt takeoffs and landings, and emergency providers to pinpoint probable trouble areas. Such actions can save lives and money. As understood herein, it is possible to leverage existing infrastructure to provide such early warning of an impending earthquake.

SUMMARY OF THE INVENTION

Accordingly, a computer includes a housing, a processor in the housing, and a video camera coupled to the housing and communicating with the processor. The processor executes logic to use first image information generated by the video camera at a first time and at least second image information generated by the video camera at a second time to render a motion output. Based at least in part on the motion output, an earthquake detection signal (EDS) indicating that an earthquake is impending is selectively generated.

In some implementations the processor generates the EDS responsive to a determination that the comparison indicates oscillating motion within a predetermined time period. If desired, responsive to a determination that the motion output indicates an earthquake, the processor uploads the EDS to a communication network for transfer thereof to other computers. In specific embodiments the computer is a first computer, the EDS is a first EDS, and an earthquake alarm is generated in response to the first EDS only if at least a second computer generates a second EDS within a predetermined period of the first EDS to validate the first EDS.

The motion output may be compared to a template and the EDS generated responsive to a determination of a substantial match between the motion output and the template. The motion output may represent horizontal motion relative to the Earth's surface and/or vertical motion relative to the Earth's surface. In example non-limiting embodiments the motion output is derived from subpixel motion estimation.

In another aspect, a method includes generating a video image and using a first computer, determining motion within the image. The method further includes determining whether the motion within the image fits at least one earthquake criterion. An indication that an earthquake is impending is presented on a computer display responsive to a determination that the motion within the image fits the at least one earthquake criterion.

In another aspect, a computer includes a processor receiving image signals from a video camera, and a non-transitory computer storage medium accessible to the processor and bearing logic. The logic is executed by the processor to selectively determine an earthquake is impending responsive to motion of at least one object in the image signals. An earthquake detection signal (EDS) is generated responsive to a determination that an earthquake is impending.

The details of the present invention, both as to its structure and operation, can best be understood in reference to the accompanying drawings, in which like reference numerals refer to like parts, and in which:

BRIEF DESCRIPTION OF THE DRAWINGS

FIG. 3 is an example non-limiting earthquake wave template.

DETAILED DESCRIPTION OF THE PREFERRED EMBODIMENT

Figure 1:
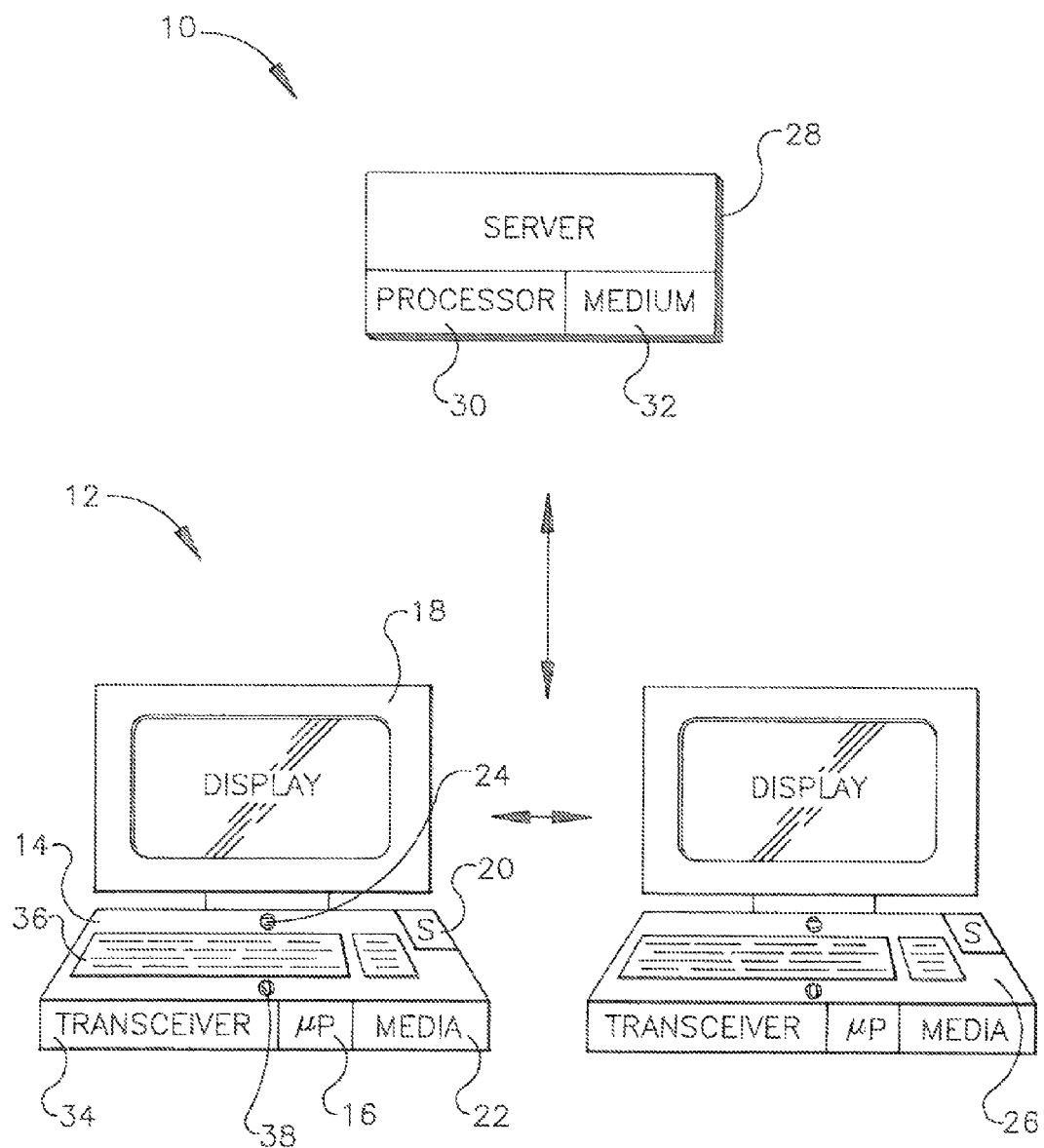
FIG. 1 is a block diagram of an example system in accordance with present principles.

Referring initially to FIG. 1, a system 10 is shown that includes a computer 12 such as a laptop or notebook computer, a PC, or a personal digital assistant that in turn typically has portable lightweight plastic housing 14 bearing a digital processor 16. The processor 16 can control a visual display 18 and an audible display 20 such as one or more speakers.

To undertake present principles, the processor 16 may access one or more computer readable storage media 22 such as but not limited to disk-based or solid state storage. In example non-limiting embodiments, the media 22 may store various software modules, including, for example, a module bearing logic executable by the processor to undertake present principles.

A video camera 24 may also be coupled to the housing 14. The camera 24, which may include, e.g., a charge-coupled device (CCD), sends signals representing images to the processor 16. Also, the processor 16 may communicate with another like computer 26 and/or with an Internet server 28 having a server processor 30 and server storage medium 32 using a communications interface 34, such as a wired or wireless modem or telephone transceiver. The computers 12, 26 may each execute portions of the logic herein and the server 28 likewise may execute certain portions such as the below-described validation logic. One or more input devices such as a keypad 36 and point and click device 38 may be provided on the computer 12 (and likewise on the computer 26 as shown) to provide a means for inputting user commands to the processor 16.

Figure 2:
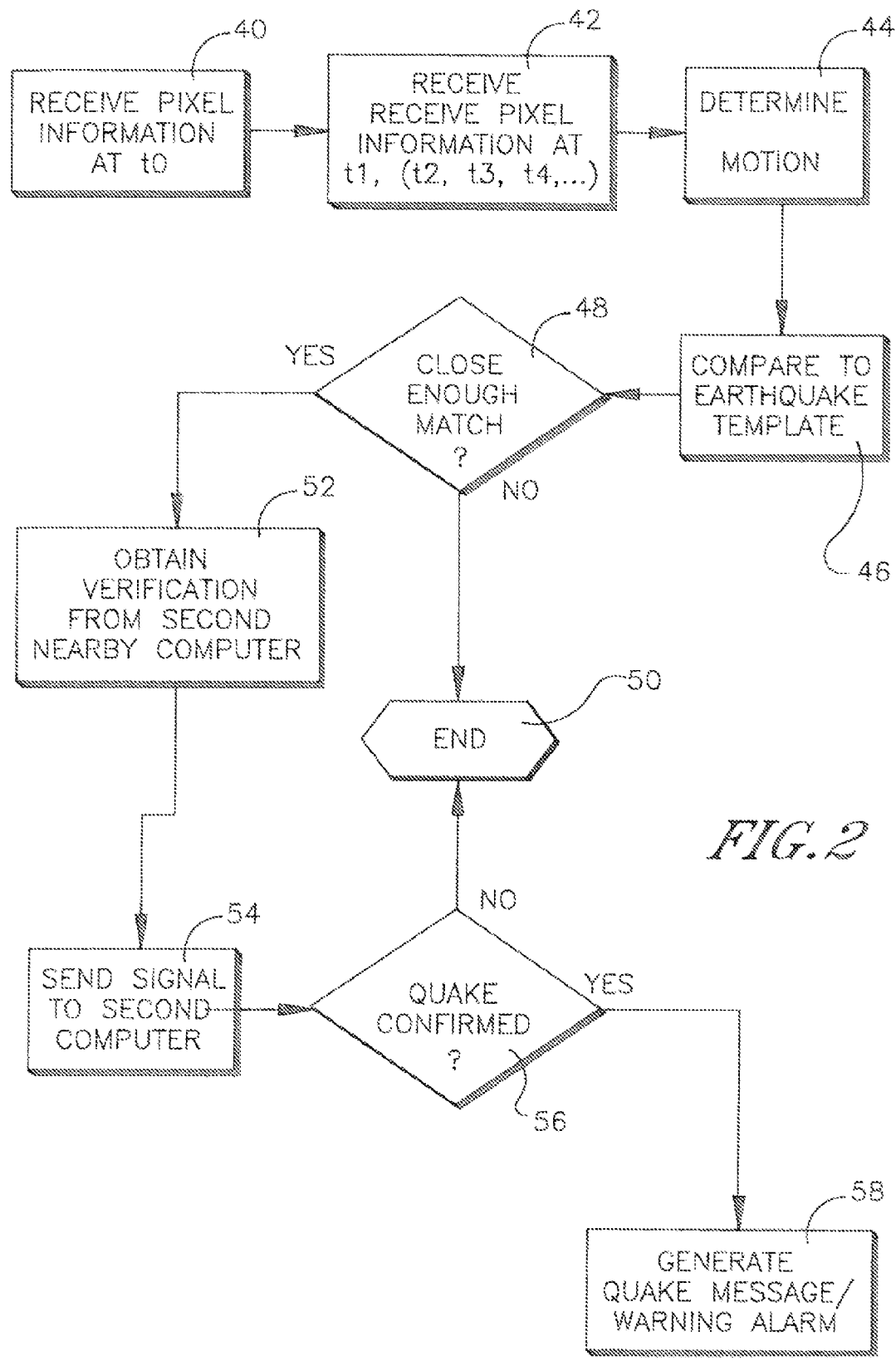
FIG. 2 is a flow chart of example logic for providing an earthquake message and/or warning.

Now referring to FIG. 2, at block 40 the processor 16 receives pixel information from the camera 24 at time "t0", and then at block 42 receives additional pixel information at one or more subsequent times, i.e., times "t1", "t2", "t3", "t4", . . . . The times are closely staggered, e.g., are a few milliseconds or even a few microseconds apart.

Proceeding to block 44 the information generated by the video camera 24 at the various times is used to determine motion. By way of non-limiting example, a macro block of pixels in the image may be used or image recognition principles may be used to identity an image in front of the camera, and the image information from the succession of times is used to determine relative motion of the image over time within the camera's field of view. This may be as simple as identifying a human face, a desk, or other recognizable object within the image and then noting changes in that object's position within the image over the times "t0", . . . "t4" to determine its motion. The motion may represent vertical motion of the object relative to the Earth's surface, and/or horizontal motion of the object in the north-south dimension, and/or horizontal motion of the object in the east-west dimension.

Or, the motion of an object in the image may be determined using derived subpixel motion estimation techniques. Non-limiting examples of such techniques are described in Suh et al., *Fast Sub-pixel Motion Estimation Techniques Having Lower Computational Complexity*, 50 IEEE Transactions on Consumer Electronics 3 (August 2004) and Argyriou et al., *A Study of Sub-pixel Motion Estimation Using Phase Correlation*, available at www.macs.hw.ac.uk/bmvc2006/papers/ 328.pdf. Both of the above documents appear in the present file history and both are incorporated herein by reference.

Based on the motion determined at block 44, an earthquake detection signal (EDS) indicating that an earthquake is impending is selectively generated. In one example, this may be done by proceeding to block 46 to compare the detected motion with a template of earthquake-caused motion. An example template is discussed further below. If, at decision diamond 48, it is determined that the detected motion does not match the template within a predetermined threshold, the logic ends at state 50, but when the detected motion substantially matches the template a quake is indicated.

In some embodiments, prior to generating an alarm, if desired the logic may move from a positive test result at decision diamond 48 to block 52, wherein verification of an earthquake is obtained by accessing a second (typically nearby) computer such as the computer 26 shown in FIG. 1. The motion detected by the first computer (e.g., the computer 12) may also be sent to the second computer 26 at block 54 to allow both computers to independently verify an earthquake. Yet again, both computers may send their determinations to the server 28, which may conduct the verification steps and send the results back to the computers 12, 26. Signals from more than two computers may be used, if desired, to undertake the verification.

In other words, motion signals from two or more computers can be cross-correlated to reject false alarms. Similarities (or lack thereof) in signals received from different computers can be identified and compared, and a determination made that the signals represent an earthquake if their patterns match. On the other hand, for example, if one computer detects movements not from an earthquake but from a moving table, its motion signal would not cross-correlate with any other computer signals and so it would be rejected as an earthquake indication.

In any case, if the verification steps indicate that both computers determine that they have detected earthquake-like motion at decision diamond 56, the logic moves to block 58 to generate an audible and/or visible alarm (on, e.g., the display 18/speaker 20) representing a message that an earthquake is impending. In the case wherein no verification is undertaken the logic flows immediately from a positive test at decision diamond 48 to block 58.

FIG. 3 shows an example template 60 against which detected motion may be compared. The amplitude or velocity of the y-axis may be in the vertical plane or east-west or north-south horizontal planes as discussed above. Indeed, three comparisons, one for each of the above dimensions, may be undertaken and only if all three, or two of the three, match the template is an EDS generated.

As shown, the earliest wave-like form is the P-wave, followed by the S-wave. The comparison at block 46 in FIG. 2 may thus compare the frequency and amplitude decay of the detected motion of the imaged object with that of the template and if, for example, a match within a threshold is determined, an EDS is generated. In other words, an EDS can be generated responsive to a determination of oscillating motion of the imaged object within a predetermined time period, with a predetermined amplitude decay.

While an earthquake will affect not just the computer 12 with camera 24 but also objects within the camera's field of view, owing to structural differences, material differences, mounting differences, etc., relative motion nonetheless can be expected between the camera and objects within its field of view.

The alarm and/or message generated at block 58 may further indicate, based on the characteristics of the P-wave, the expected time until the arrival of the S-wave. For example, a higher P-wave frequency may indicate a sooner S-wave arrival while a lower P-wave frequency may indicate a later S-wave arrival, and a message of such may be generated. Yet again, the expected severity of the S-wave may be included in the message/warning at block 58 based on the frequency or other characteristic of the P-wave, with, e.g., a higher frequency indicating a stronger S-wave and a lower frequency indicating a weaker S-wave.

While the particular USING COMPUTER VIDEO CAMERA TO DETECT EARTHQUAKE is herein shown and described in detail, it is to be understood that the subject matter which is encompassed by the present invention is limited only by the claims.

What is claimed is:

1. Computer comprising:
housing;
processor in the housing;
video camera coupled to the housing and communicating with the processor, the processor executing logic to use first image information generated by the video camera at a first time and at least second image information generated by the video camera at a second time to render a motion output and based at least in part on the motion output, selectively generating an earthquake detection signal (EDS) indicating that an earthquake is impending, wherein the motion output is compared to a template and the EDS is generated responsive to a determination of a substantial match between the motion output and the template.

2. The computer of claim 1, wherein the motion output represents an oscillating motion within a predetermined time period.

3. The computer of claim 1, wherein responsive to a substantial match between the motion output and the template, the processor uploads the EDS to a communication network for transfer thereof to other computers.

4. The computer of claim 3, wherein the computer is a first computer, the EDS is a first EDS, and an earthquake alarm is generated in response to the first EDS only if at least a second computer generates a second EDS within a predetermined period of the first EDS to validate the first EDS.

5. The computer of claim 1, wherein the motion output represents horizontal motion relative to the Earth's surface.

6. The computer of claim 1, wherein the motion output represents vertical motion relative to the Earth's surface.

7. The computer of claim 1, wherein the motion output is derived from subpixel motion estimation.

8. Method comprising:

generating a video image;

using a first computer, determining motion within the image;

determining whether the motion within the image fits at least one earthquake criterion; and presenting on a computer display an indication that an earthquake is impending responsive to a determination that the motion within the image fits the at least one earthquake criterion, wherein determining whether the motion within the image fits at least one earthquake criterion is undertaken by comparing the motion within the image to a template, the indication that an earthquake is impending being generated responsive to a determination of a substantial match between the template and the motion within the image.

9. The method of claim 8, wherein the act of presenting is undertaken only if the determination of a substantial match between the template and the motion within the image is verified by at least a second computer different from the first computer.

10. The method of claim 8, wherein the motion within the image represents horizontal motion relative to the Earth's surface.

11. The method of claim 8, wherein the motion within the image represents vertical motion relative to the Earth's surface.

12. The method of claim 8, wherein the motion within the image is derived from subpixel motion estimation.

13. Computer comprising:

processor receiving image signals from a video camera;

non-transitory computer storage medium accessible to the processor and bearing logic to cause the processor to:

selectively determine an earthquake is impending responsive to motion of at least one object in the image signals; and generate an earthquake detection signal (EDS) responsive to a determination that an earthquake is impending, wherein the image signals are compared to a template and the EDS is generated responsive to a determination of a substantial match there between.

14. The computer of claim 13, wherein the EDS is used to generate a text message.

15. The computer of claim 13, wherein the EDS is used to generate an audible or visual alarm presented on the computer.

16. The computer of claim 13, wherein the processor uses subpixel motion estimation to make the determination of a substantial match.

* * * * *